Oct. 12, 1926.  1,602,712
O. E. SEGRIN ET AL
COATING MACHINE
Filed Jan. 5, 1923   4 Sheets-Sheet 2
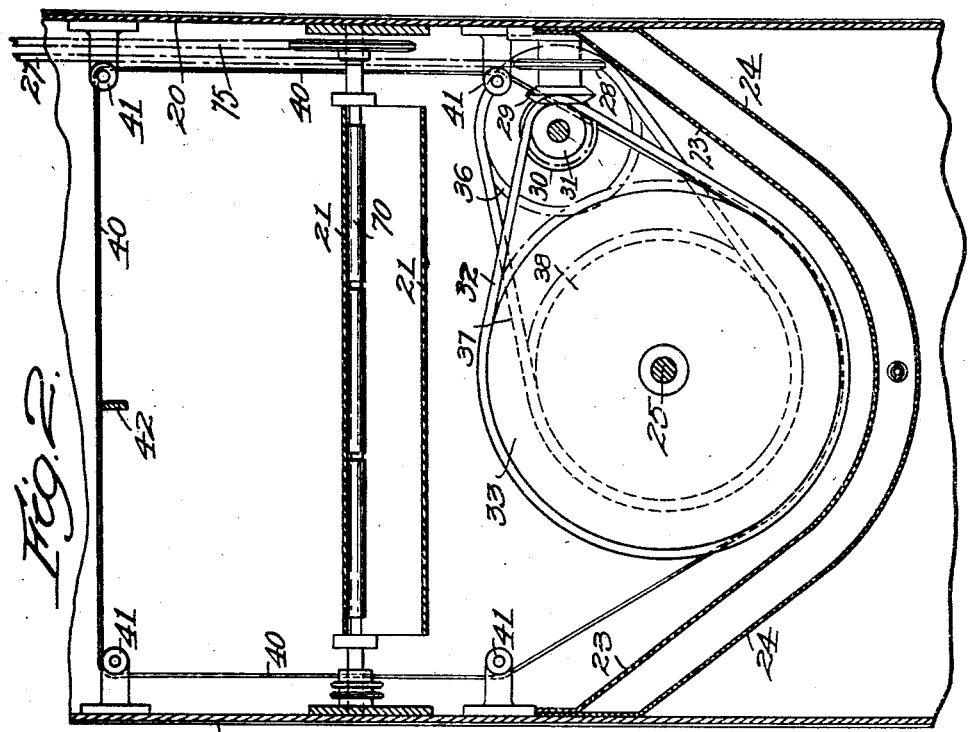
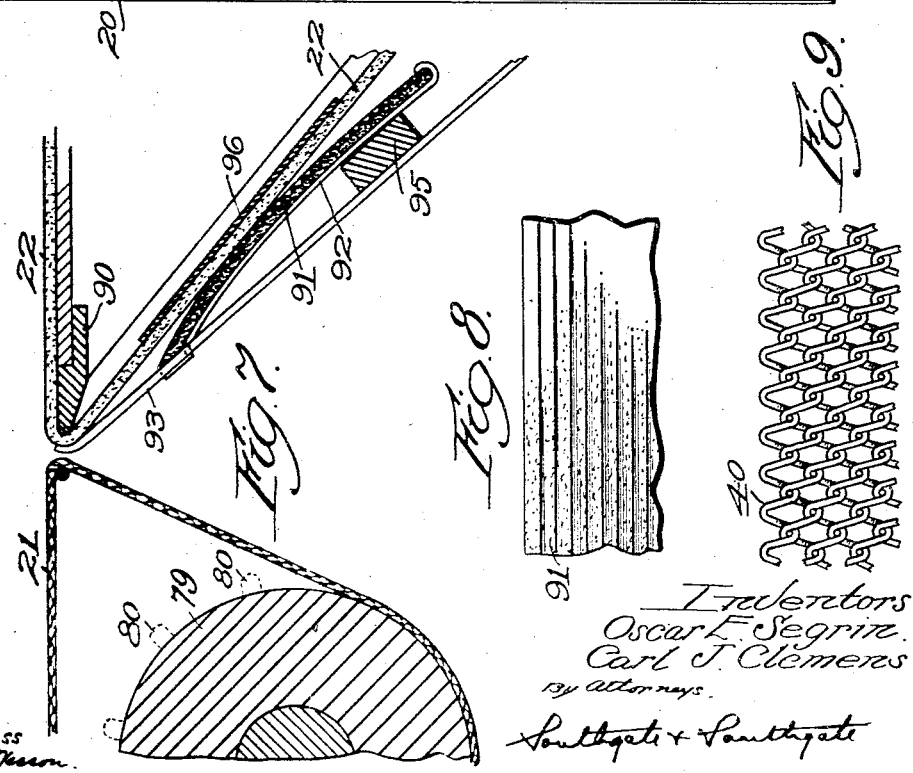

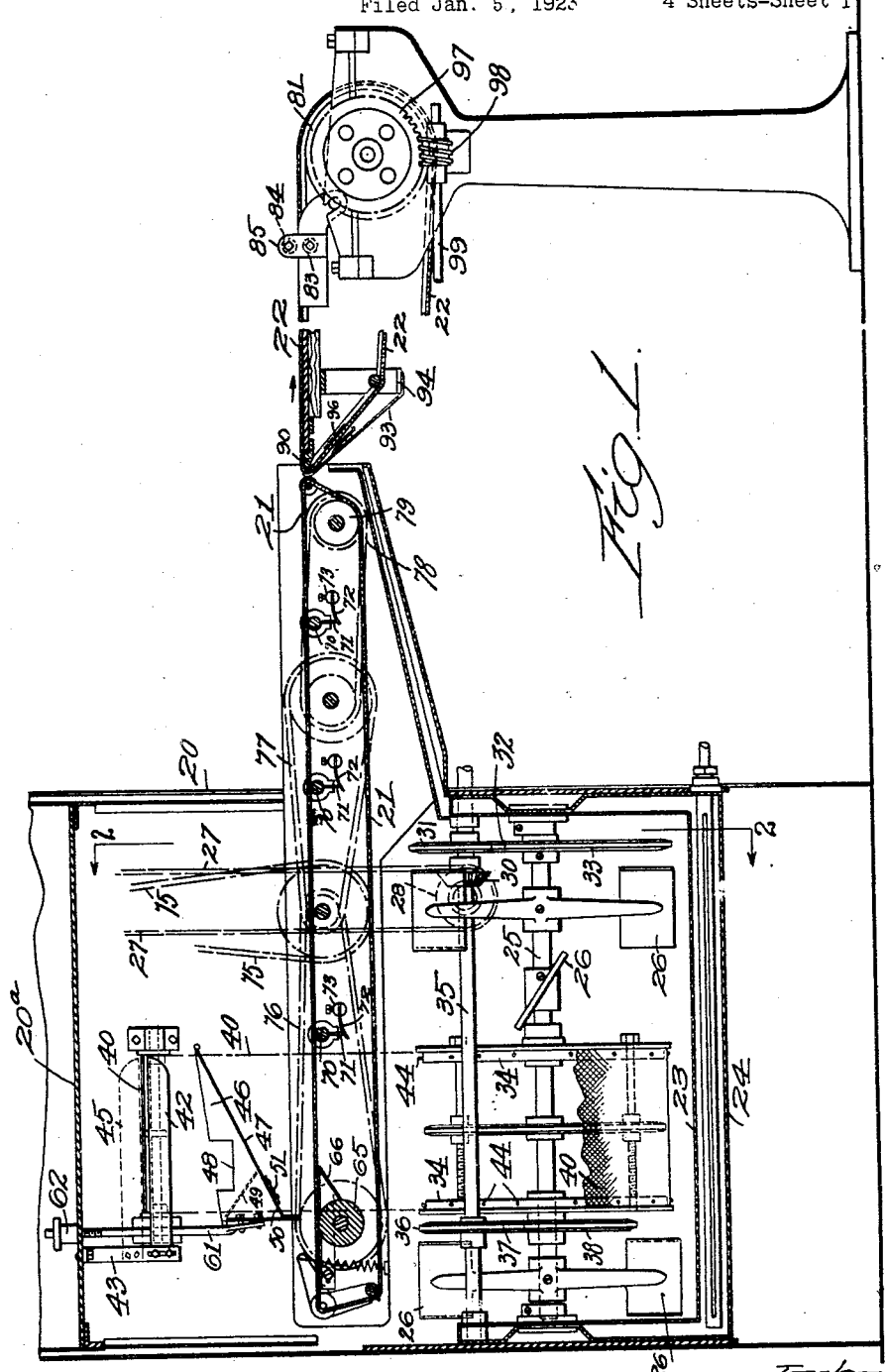

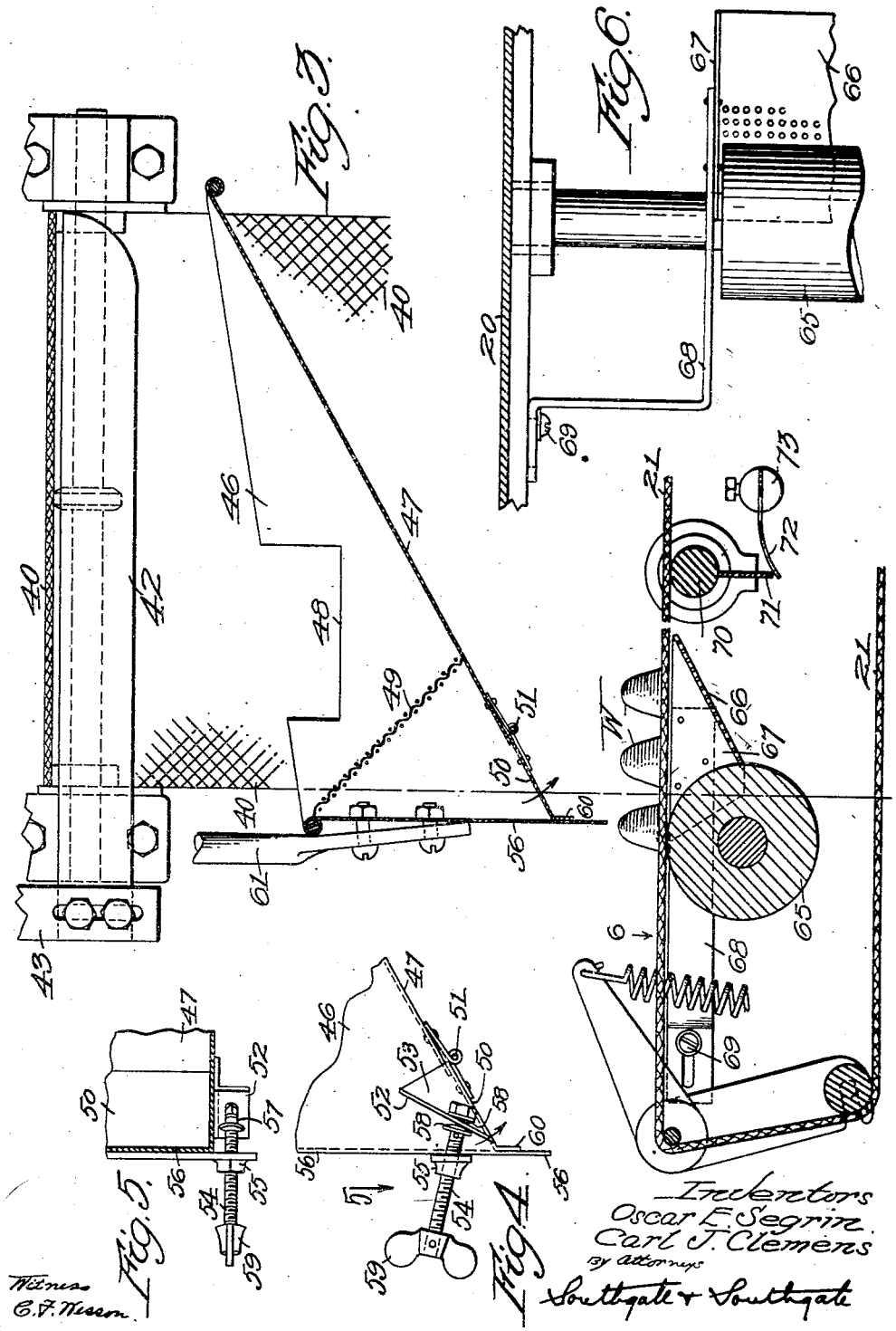

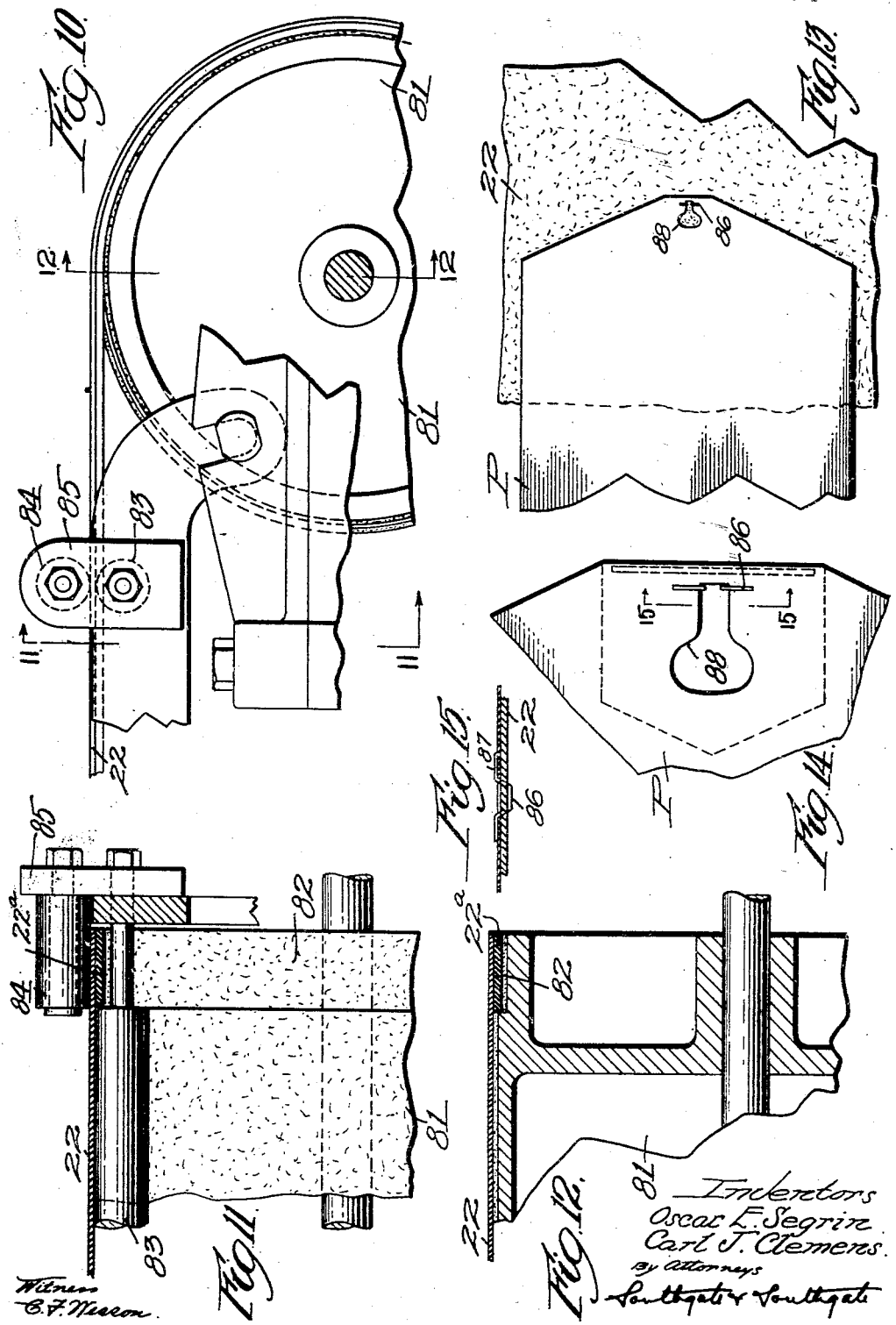

Patented Oct. 12, 1926.

1,602,712

UNITED STATES PATENT OFFICE.

OSCAR E. SEGRIN, OF SPRINGFIELD, AND CARL J. CLEMENS, OF EAST LONGMEADOW, MASSACHUSETTS.

COATING MACHINE.

Application filed January 5, 1923. Serial No. 610,799.

This invention relates to a machine for applying a coating of chocolate or other similar material to confectionery or other food products.

It is the general object of our invention to improve the construction of such machines, making them more efficient in operation and capable of producing more satisfactory results when in use.

With this general object in view, one feature of our invention relates to the provision of an improved conveying device for elevating chocolate from a heating tank to its point of delivery above the work. The term "chocolate" in this specification should be understood to include any other similar materials used for coating food products.

Another feature of our invention relates to the provision of an improved chocolate delivery device or feeding receptacle and to convenient means for adjusting the flow therefrom.

Additional features of our invention relate to an improved device for applying a heavy coating of chocolate to the bottom or under side of the work; to an improved type of conveyor belt and guiding devices therefor; to means for cleaning the conveyor rolls; to a tension device or drag for the plaque papers; and to other arrangements and combinations of parts which will be hereinafter described and more particularly pointed out in the appended claims.

A preferred form of our invention is shown in the drawings in which

Fig. 1 is a longitudinal sectional elevation of our improved machine;

Fig. 2 is a transverse sectional elevation taken along the line 2—2 in Fig. 1;

Fig. 3 is an enlarged side elevation of the chocolate delivery device or feeding receptacle, of a portion of the chocolate elevating mechanism, and also of certain parts of the work conveying mechanism;

Fig. 4 is a detail side elevation of the regulating device for the chocolate feed;

Fig. 5 is a plan view of the parts shown in Fig. 4;

Fig. 6 is a partial detail plan view of the bottoming attachment, looking in the direction of the arrow 6 in Fig. 3;

Fig. 7 is an enlarged longitudinal sectional elevation of portions of the work conveyor and delivery mechanism, particularly showing the tension device for the plaque papers;

Fig. 8 is a detail view of a portion of the rubber drag or tension device shown in section in Fig. 7;

Fig. 9 is a detail view of a portion of the chocolate elevating belt or conveyor;

Fig. 10 is a detail side elevation of certain driving and guiding devices for the feeding and delivery belts;

Fig. 11 is a detail sectional elevation, taken along the line 11—11 in Fig. 10;

Fig. 12 is a detail sectional elevation of the conveyor and drum or pulley therefor, taken on the line 12—12 in Fig. 10; and Figs. 13, 14 and 15 are detail views showing the means by which the plaque papers are detachably secured to the delivery belt.

Referring to the drawings, we have shown a coating machine comprising a casing 20 within which the coating mechanism is contained, a work conveyor 21 adapted to advance the work through the casing 20, and a delivery conveyor 22 to which the usual plaque papers P may be secured and on which the coated articles are deposited. In the actual use of the machine a feeding conveyor is provided for advancing the cores or other articles to be coated to the conveyor 21. This feeding conveyor is omitted from the drawings, but is in general similar to the delivery conveyor, with the omission of the paper attaching devices.

Referring particularly to Figs. 1 and 2, we have provided the usual chocolate heating tank 23 within which the melted chocolate is contained and in which it is maintained at the desired temperature by a steam or water jacket 24. A shaft 25 is rotatably mounted in bearings in the side walls of the tank 23 and is provided with a plurality of stirrers 26 for thoroughly mixing and stirring the heated chocolate. The shaft 25 is preferably driven by a motor (not shown) mounted in the upper portion of the casing 20 and connected with the shaft 25 by a chain 27 (Fig. 1), sprocket 28, bevel gears 29 and 30, sprocket 31, chain 32 and sprocket 33, the latter sprocket being fixed to the shaft 25. Through these connections the shaft 25 is rotated at a relatively slow speed and the chocolate is thoroughly mixed in the tank 23.

A skeleton drum or pulley 34 (Fig. 1) is loosely mounted between collars on the shaft 25 and is driven from a shaft 35 on which the bevel gear 30 and sprocket 31 are mounted. The driving connection comprises a sprocket 36 on the shaft 35, a chain 37, and sprocket 38 secured to the drum 34. The ratio of the sprockets 36 and 38 is such that the drum 34 will rotate at a considerable higher speed than the shaft 25. A chocolate belt or conveyor 40 is driven by the drum 34, from which it passes upward adjacent one side of the casing 20, thence across the casing in the upper portion thereof to the opposite side where it again descends to the drum 34 in the heating tank 23. Suitable guide pulleys 41 (Fig. 2) are provided for conducting the belt 40 along the path indicated.

In the preferred embodiment of our invention, we use a wire mesh conveyor or belt of the general type shown in Fig. 9, but it will be understood that our invention is not limited to this particular type of belt otherwise than as set forth in the claims.

A scraper 42 (Fig. 1) is mounted in the upper part of the casing 20 and extends closely adjacent the under side of the conveyor 40 in its upper transverse run. The scraper 42 is supported by a bracket 43 and has a bolt and slot connection thereto by which it may be vertically adjusted to more or less closely engage the conveyor 40. Driving pins 44 (Fig. 1) are preferably provided in the edges of the drum 34 to advance the chocolate conveyor as the drum 34 rotates. The mesh fabric shown in Fig. 9 is of such a cellular construction that a very large quantity of chocolate may be raised by the conveyor and is removed therefrom by the scraper 42. An additional upper scraper 45, indicated in dotted lines in Fig. 1, may be provided when it is desirable to remove an even larger amount of chocolate from the conveyor during its transverse upper run.

The chocolate as it is removed from the conveyor is received in a delivery device in the form of a pan or receptacle 46 from which it is delivered in a heavy stream to the work W (Fig. 3) as the work is drawn through the casing 20 by the work conveyor 21. The pan 46 has certain special features of construction which will now be described.

The pan is in general of a triangular shape having a sharply inclined bottom plate 47 and having an overflow opening or spillway 48 at one side through which any surplus chocolate may be returned to the heating tank. A screen 49 forms an inner partition in the pan 46, through which the chocolate flows to the bottom opening of the pan which is provided with a regulating gate 50 pivoted at 51 to the bottom plate 47. The plate 50 is preferably formed of sheet metal and has an ear or wing 52 at one or both ends thereof.

As shown herein, the wing 52 is formed by bending upward and outward an integral projection 53 of the gate 50. An adjusting screw 54 is threaded in a nut 55 fixed to the front plate 56 of the pan 46. The end of the screw 54 extends through a slot 57 (Fig. 5) in the wing 52 and oval-faced collars 58 engage the wing 52 on both sides thereof. A wing nut 59 is secured to the end of the screw 54 by which it may be turned to swing the gate 50 upon its pivot 51, thus varying the opening between the downwardly projecting edge 60 of the gate 50 and the lower portion of the front plate 56. The flow of chocolate from the pan 46 may thus be conveniently adjusted to correspond with the requirements of the particular work W passing through the machine.

The pan 46 may be adjustably supported in the casing 20 by a threaded rod 61 (Fig. 1) extending through a cross plate 20$^a$ in the upper portion of the casing 20 and having an adjusting nut 62 for regulating the position thereof. The work conveyor 21 is preferably of an open mesh wire fabric and may be similar in structure to the chocolate conveyor or belt 40. The surplus chocolate passes through the belt 21 and is received in the heater tank 23.

It has been found difficult to provide the work W with a sufficiently heavy and satisfactory coating on the under side thereof and we have made special provision for thus bottoming the work in our improved machine. For this purpose a relatively large driven roller 65 is mounted in the casing 20 directly beneath the work feeding conveyor 21 and adjacent the point at which the chocolate flows over the work W.

A bottoming plate 66 extends across the casing beneath the conveyor 21 and may be provided with wings or end plates 67 at each end of the roll 65. The plate 66 is preferably perforated to prevent the formation of an air pocket above the plate and is supported on brackets 68 (Fig. 6) adjustably secured to the casing 20 by screws 69.

In the operation of the machine, the plate 66 is set at such a distance from the roller 65 that a large portion of the chocolate delivered from the pan 46 will pass through the opening between the plate and roll into the tank. The opening is sufficiently restricted, however, so that a portion of the chocolate will be backed up and retained in the pocket formed by the plate 66 and roll 65, overflowing the pocket and particularly coating the work W on the under side through the meshes of the conveyor 21. This provision of means for thus coating the work on the under side is of very great importance and removes one serious objection to the use of this type of machine, which has heretofore commonly required the services of a separate bottoming machine or attachment, when well coated work was to be produced.

As the feeding conveyor 21 passes through the machine it is supported upon a plurality of guide rolls 70 and it is necessary for the smooth and satisfactory operation of the machine that these guide rolls be kept clear of accumulations of chocolate. For this purpose we have provided a special construction and arrangement of scraper for each roll 70. Each scraper consists of a plate 71 (Fig. 3) extending axially of its roll 70 and mounted in guiding slots to slide radially of the roll. Flat springs 72 are secured in slots in bosses 73 formed on the inner sides of the casing 20 and these springs yieldingly force the scrapers against the rolls 70, removing the chocolate therefrom. The springs 72 are made of sheet material selected as to thickness so as to give the desired tension on the scrapers. With this construction, each scraper 71 may be very easily removed and replaced when desired.

The conveyor or belt 21 is actuated by suitable driving mechanism indicated in Fig. 1, and including a sprocket chain 75 driven from a motor and connected by additional sprockets and by chains 76, 77 and 78 to the roll 65 and to an additional roll 79 by which the belt 21 is driven. Driving pins 80 (Fig. 7) may be provided on the roll 65 or the roll 79 or both of them for engaging the meshes of the conveyor belt, if so desired.

The delivery conveyor 22 is preferably formed of canvas or other fabric and is provided with thickened edge portions 22ª (Fig. 11) which may be conveniently produced by stitching or otherwise securing a narrow strip of thicker material along each edge of the belt. These strips not only reinforce the belt but also greatly assist in keeping the belt straight. The driving drum 81 (Figs. 10 and 12) for the belt 22 is recessed at its edges, as indicated at 82, to receive the thickened edge portions of the belt 22 and the guide rolls 83 for the belt are also reduced in diameter at their ends for the same purpose. The guide roll 83 adjacent the drum 81 is also provided with retaining rolls 84 (Figs. 10 and 11) mounted on brackets 85 and directly above the guide roll. The retaining rolls 84 are so close to the surface of the roll 83 that the belt can only pass between these parts when the thickened edge portions of the belt are in the recesses at the ends of the guide roll 83. In this way the belt 22 is constrained to follow a straight and undeviating path, a result which is particularly desirable in connection with coating machines.

It is customary to detachably secure sheets P of waxed or paraffine paper to the delivery belt 22, these sheets being known as "plaque papers" and receiving the chocolate-coated articles from the work feeding belt 21. The customary means of attaching the papers to the belt 22 is shown in Figs. 13, 14 and 15 and comprises wire staples 86 secured in the belt and having the projecting upper ends 87 out-turned and adapted to be received in a key-hole opening 88 in the leading end of each plaque paper P.

In the operation of the machine the filled papers are removed and fresh papers are attached during the upper run of the belt 22, away from the coating mechanism. The freshly attached papers are then carried around the driving drum 81 and back along the lower run, being finally returned to upper and operative position at the point where the conveyor or belt 22 makes a sharp angle around a guide plate 90 (Fig. 7) closely adjacent a corresponding turn of the work conveyor 21.

In order that the plaque papers may be properly tensioned and smoothly delivered at this turning point, we have provided an improved tension device or drag, best shown in Fig. 7. This device consists of a piece of sheet material 91, preferably corrugated rubber, supported on a metal plate 92 extending across the machine and which is itself supported by a spring plate 93 mounted on a fixed cross bar 94 (Fig. 1). A spacing block 95 may be interposed between the plates 92 and 93 and a backing or resistance plate 96 supports the conveyor 22 against the thrust of the tension device. The rubber sheet 91 is thus yieldingly forced against the plaque papers by the spring plate 93 and tensions the papers so they are smoothly delivered to the upper run of the conveyor.

The drum 81 is conveniently driven by a worm wheel 97 and worm 98 (Fig. 1), the latter being mounted on a shaft 99 having suitable connections to the driving motor.

The specific construction of the conveyor belt and its driving mechanism is not claimed herein but forms the subject matter of a divisional application, Serial No. 61,886, filed by us October 12, 1925.

Having thus described our invention and the operation and advantages of the several parts thereof, we do not wish to be limited to the details herein disclosed otherwise than as set forth in the claims, but what we claim is:—

1. In a coating machine, a casing, a heating tank for the coating material positioned in the lower part of said casing, a delivery device for the coating material, a carrier to feed the articles to be coated beneath said delivery device, a perforated conveyor for the coating material movable transversely of the machine in a closed path through said tank around said carrier and over said delivery device, and means to remove the coating material from said conveyor above said delivery device.

2. In a coating machine, a casing, a heating tank for the coating material positioned in the lower part of said casing, a delivery device for the coating material, a carrier to feed the articles to be coated beneath said delivery device, a perforated conveyor for the coating material movable transversely of the machine in a closed path through said tank around said carrier and over said delivery device, and means to remove the coating material from said conveyor above said delivery device, said removing means engaging the under side of said conveyor and being adjustable relative thereto.

3. In a coating machine, a casing, a heating tank for the coating material positioned in the lower part of said casing, a delivery device for the coating material, a carrier to feed the articles to be coated beneath said delivery device, a perforated conveyor for the coating material movable transversely of the machine in a closed path through said tank around said carrier and over said delivery device, and means to remove the coating material from said conveyor above said delivery device, said conveyor being formed of wire with open meshes effective to raise and deliver coating material in relatively large quantities.

4. In a coating machine, a delivery device for the coating material comprising a receptacle having an inclined bottom member with an opening at the lower end thereof, a gate pivoted to swing in said opening, and means to adjust the position of said gate, said means comprising an adjusting screw mounted on said receptacle and connected to said gate to move said gate and to hold said gate in adjusted position.

5. In a coating machine, a mesh conveyor for feeding articles to be coated, means to flow the coating material over said articles, a roll underlying said conveyor adjacent the point where the coating material is applied, and a plate mounted adjacent said roll and beneath said conveyor, said plate and roll forming a pocket in which the material is backed up over the conveyor to coat the under sides of said articles.

6. In a coating machine, a mesh conveyor for feeding articles to be coated, means to flow the coating material over said articles, a roll underlying said conveyor adjacent the point where the coating material is applied, and a plate mounted adjacent said roll and beneath said conveyor, said plate and roll forming a pocket in which the material is backed up over the conveyor to coat the under sides of said articles, and said plate being adjustable toward and from the roll to permit more or less coating material to escape from the pocket.

In testimony whereof we have hereunto affixed our signatures.

OSCAR E. SEGRIN.
CARL J. CLEMENS.